(12) United States Patent
Bashetti et al.

(10) Patent No.: US 12,163,550 B2
(45) Date of Patent: Dec. 10, 2024

(54) ANTI-ROTATION WASHER

(71) Applicant: Aktiebolaget SKF, Gothenburg (SE)

(72) Inventors: Amol Bashetti, Pune (IN); Gopal Kamble, Pune (IN); Raju Pal, Pune (IN)

(73) Assignee: Aktiebolaget SKF, Gothenburg (SE)

(*) Notice: Subject to any disclaimer, the term of this patent is extended or adjusted under 35 U.S.C. 154(b) by 180 days.

(21) Appl. No.: 17/887,423

(22) Filed: Aug. 13, 2022

(65) Prior Publication Data

US 2023/0062673 A1  Mar. 2, 2023

(30) Foreign Application Priority Data

Aug. 31, 2021 (IN) .............................. 202141039380

(51) Int. Cl.
*F16B 39/24* (2006.01)
*F16B 39/10* (2006.01)

(52) U.S. Cl.
CPC .............. *F16B 39/24* (2013.01); *F16B 39/10* (2013.01)

(58) Field of Classification Search
CPC .......... F16B 39/10; F16B 39/24; F16B 43/00; Y10S 411/957
USPC ...... 411/132, 136, 143, 352–353, 371.2, 531
See application file for complete search history.

(56) References Cited

U.S. PATENT DOCUMENTS

| | | | |
|---|---|---|---|
| 239,124 A | 3/1881 | Tombow | |
| 599,690 A * | 3/1898 | Deadman | F16B 39/24 |
| | | | 411/953 |
| 641,319 A * | 1/1900 | Parbel | F16B 39/24 |
| | | | 411/953 |
| 708,385 A * | 9/1902 | McConnell | F16B 39/10 |
| | | | 411/128 |
| 757,457 A | 4/1904 | Hancock | |
| 842,575 A | 1/1907 | Mcmahon | |
| 1,003,804 A | 9/1911 | Rosser | |
| 1,176,795 A | 3/1916 | Vanderburg | |
| 1,275,359 A | 8/1918 | Bailey | |
| 1,317,332 A | 9/1919 | Stark | |
| 1,468,120 A | 9/1923 | Sawulchik | |
| 2,366,869 A | 1/1945 | Olson | |
| 3,212,746 A | 10/1965 | Wright | |
| 3,282,316 A | 11/1966 | Griswold | |
| 6,948,782 B2 * | 9/2005 | Porter | B60B 27/06 |
| | | | 301/105.1 |
| 2001/0022926 A1 * | 9/2001 | Kitayama | F16B 43/001 |
| | | | 411/531 |
| 2002/0151370 A1 * | 10/2002 | Pratt | F16B 43/00 |
| | | | 470/41 |

(Continued)

FOREIGN PATENT DOCUMENTS

DE  102008001193 A1  10/2009
FR       981033 A      5/1951

(Continued)

*Primary Examiner* — Roberta S Delisle
(74) *Attorney, Agent, or Firm* — GARCIA-ZAMOR INTELLECTUAL PROPERTY LAW, LLC; Ruy Garcia-Zamor

(57) ABSTRACT

Disclosed is a circular profiled anti-rotation washer. The anti-rotation washer includes a step profile locking mechanism on a first surface. The anti-rotation washer provides a central axial aperture for receiving a threaded shaft. The step profile is a D-shaped profile and allows the washer to engage with an arm in a positive locking mechanism.

9 Claims, 2 Drawing Sheets

(56) References Cited

U.S. PATENT DOCUMENTS

| | | | |
|---|---|---|---|
| 2002/0151371 A1* | 10/2002 | Pratt | F16B 19/1054 470/41 |
| 2008/0063489 A1 | 3/2008 | Jimenez | |
| 2013/0330146 A1* | 12/2013 | Harada | F01M 11/03 411/119 |
| 2015/0292544 A1* | 10/2015 | Rousseau | F01D 5/066 411/204 |
| 2023/0140262 A1* | 5/2023 | Kim | F16B 39/282 411/10 |

FOREIGN PATENT DOCUMENTS

| | | |
|---|---|---|
| GB | 191014908 A | 5/1911 |
| GB | 191021192 A | 6/1911 |
| GB | 191025742 A | 11/1911 |
| JP | 2009103158 A | 5/2009 |
| KR | 20180038303 A | 4/2018 |
| KR | 102048634 B1 | 11/2019 |
| WO | 2015/016317 A1 | 2/2015 |

\* cited by examiner

ANTI-ROTATION WASHER

CROSS REFERENCE TO RELATED APPLICATION

This patent application claims the benefit of the Indian patent application No. 202141039380 dated Aug. 31, 2021, which is incorporated by reference herein in its entirety.

FIELD OF THE INVENTION

The present disclosure generally relates to a washer, and more particularly relates to an anti-rotation washer for engaging with an arm having a mounted hub.

BACKGROUND OF THE INVENTION

During cultivation, primary tilling and secondary tilling of the land is done to make a good seedbed for the crops. Typically for secondary tillage, a hub mounted on a tractor are commonly used as implements. A hub frame typically comprises an attachment link, a beam, at least one furrow wheel, and a plurality of disc blades. The disc blades are attached to a hub assembly secured on the beam through a tillage machine arm wherein the hub is mounted on the tillage machine arm with the help of a fastener or a nut. Due to harsh environment like vibrations, high tilting forces, shock loads and stone impacts during secondary tillage, the fasteners or nuts loosen. The loosening of the nut gives rise to loss of bearing preload and can lead to unfastening of the nut, further resulting in dislocation of the hub or damage of the hub assembly. In some instances, loosening of the nut can lead to reduced life of the hub.

A nut is a type of fastener with a threaded hole and is used in conjunction with bolts to fasten various parts of a machinery. There are various types of nuts available, and the principle of fastening differs with each nut. Most of the nut's work on the principle of friction between the threads, while some nuts work on the principle of tension. Some examples of nuts are standard nuts with washers, nuts with nylon patch, distorted thread locknut, split nut, castle nut etc.

One existing mechanism to secure bolted joints is to use a Nyloc nut. A Nyloc nut is a locknut with a nylon collar insert. The nylon insert locks the nut by friction against the screw. The Nyloc nut is inefficient when it comes to sustaining vibrations. Moreover, the Nyloc nut unlocks when subjected to higher reverse torques and hence is less reliable for high torque applications like secondary tillage. Another mechanism to secure bolted joints is to use a Wedge-lock nut that secures bolted joints with tension instead of friction. Wedge-lock nuts offer higher reliability and can secure bolted joints even when subjected to extreme vibration or dynamic loads. However, Wedge-lock nuts are costly and hence may not be suitable for secondary tillage applications.

Most of the standard industrial nut's have a washer. Some of the industry standard washers are standard flat washer, spring washer, wedge locking washer, slotted washer, tooth lock washer, and split washer. However, even with the washer, there is loosening and unlocking of the nut.

There is an unmet need for a washer to prevent rotation and unlocking of the nut.

BRIEF SUMMARY OF THE INVENTION

This summary is provided to introduce a selection of concepts in a simple manner that is further described in the detailed description of the disclosure. This summary is not intended to identify key or essential inventive concepts of the subject matter nor is it intended for determining the scope of the disclosure.

The present disclosure discloses a circular profiled anti-rotation washer. The anti-rotation washer includes a step profile locking mechanism on a first surface. The anti-rotation washer includes a central axial aperture for receiving a threaded shaft. The step profile is a D-shaped profile and allows the washer to engage with an arm in a positive locking mechanism.

To further clarify advantages and features of the present disclosure, a more particular description of the disclosure will be rendered by reference to specific embodiments thereof, which is illustrated in the appended figures. It is to be appreciated that these figures depict only typical embodiments of the disclosure and are therefore not to be considered limiting of its scope. The disclosure will be described and explained with additional specificity and detail with the accompanying figures.

BRIEF DESCRIPTION OF THE FIGURES

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The disclosure will be described and explained with additional specificity and detail with the accompanying figures in which.

Figure 1:
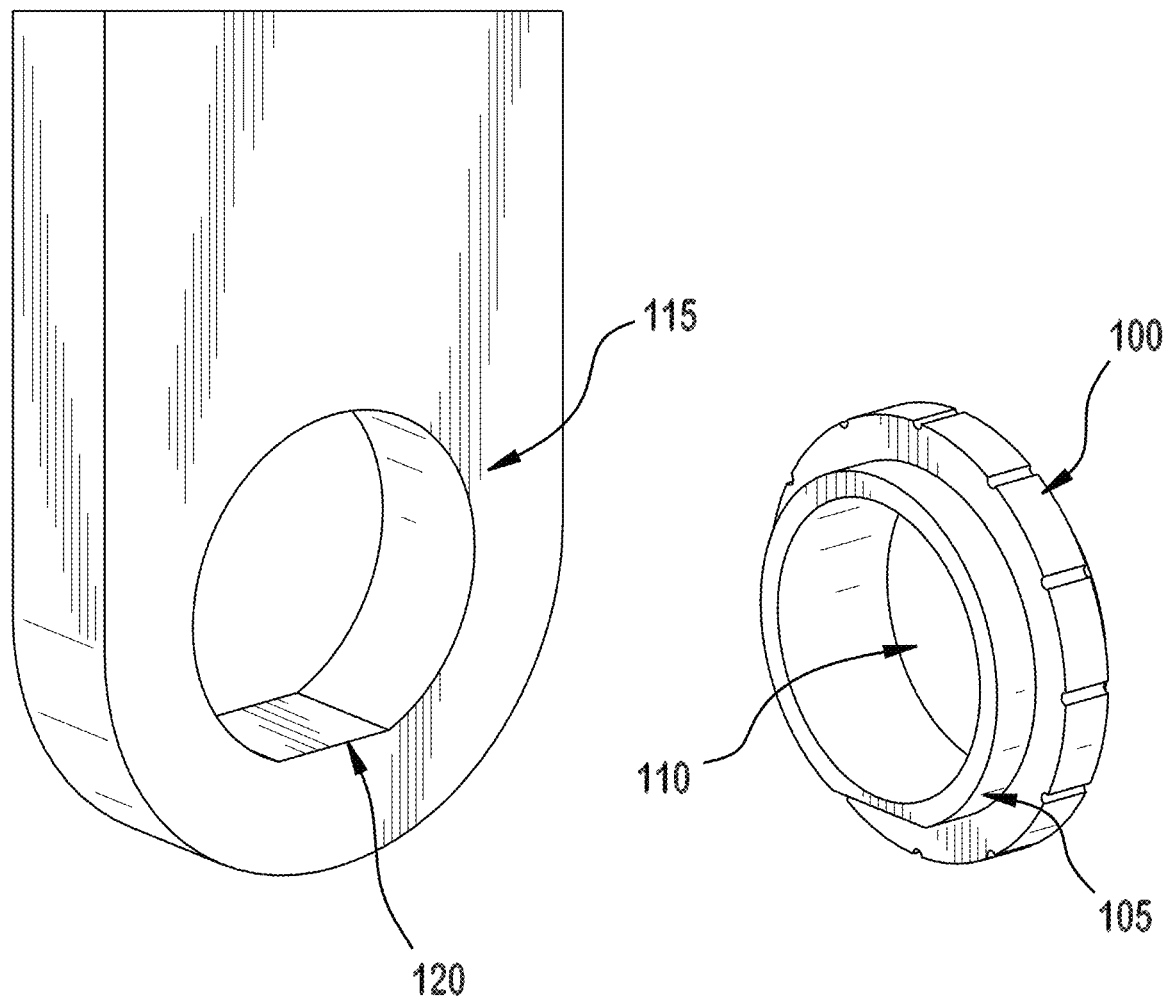
FIG. 1 illustrates an anti-rotation washer in accordance with an embodiment of the present disclosure; and FIG. 2A

Further, persons skilled in the art to which this disclosure belongs will appreciate that elements in the figures are illustrated for simplicity and may not have been necessarily drawn to scale. Furthermore, in terms of the construction of the anti-rotation washer, one or more components may have been represented in the figures by conventional symbols, and the figures may show only those specific details that are pertinent to understanding the embodiments of the present disclosure so as not to obscure the figures with details that will be readily apparent to those of ordinary skill in the art having benefit of the description herein.

DETAILED DESCRIPTION

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty) (20°) degrees, provides specific literal support for any angle greater than twenty) (20°) degrees, such as twenty-three) (23°) degrees, thirty) (30°) degrees, thirty-three-point five) (33.5°) degrees, forty-five) (45°) degrees, fifty-two (52°) degrees, or the like and thus provides support for claiming a preferred embodiment with the element moving along the arcuate path thirty-three-point five) (33.5°) degrees. For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

In the present disclosure, relational terms such as first and second, and the like, may be used to distinguish one entity from the other, without necessarily implying any actual relationship or order between such entities.

The terms "comprises", "comprising", or any other variations thereof, are intended to cover a non-exclusive inclusion, such that a process or method that comprises a list of steps does not include only those steps but may include other steps not expressly listed or inherent to such a process or a method. Similarly, one or more elements or structures or components preceded by "comprises . . . a" does not, without more constraints, preclude the existence of other elements, other structures, other components, additional devices, additional elements, additional structures, or additional components. Appearances of the phrase "in an embodiment", "in another embodiment" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The components, methods, and examples provided herein are illustrative only and not intended to be limiting.

The present invention relates to an anti-rotation washer. The anti-rotation washer is designed in such a way that it gets engaged (positive locking) in the machine arm and the washer do not rotate along its own axis and prevent the subsequent loosening of the whole lock nut.

FIG. 1 illustrates an anti-rotation washer in accordance with an embodiment of the present disclosure. The anti-rotation washer is circular in shape and can be made of steel, non-ferrous metal, or alloys.

Referring to FIG. 1, the circular profiled anti-rotation washer 100 includes a step profile 105 locking mechanism on a first surface. The step profile 105 is a D-shaped profile 105 and is interchangeable used while referring to the shape of the washer. The anti-rotation washer 100 includes a central axial aperture 110 for receiving a threaded shaft. The circular profiled anti-rotation washer 100 is detachably attachable to an arm 115. The step profile locking mechanism is used to engage with the arm 115 in a positive locking mechanism. The arm 115 comprises a truncated circular aperture 120 for receiving and engaging the step profile circular profiled locking washer 100. The arm 115 comprising the truncated circular aperture 120 receives the circular anti-rotation washer 100, and the truncated portion of the circular aperture 120 of the arm 115 and the truncated portion (D-profile 105) of the washer 100 are aligned such that the arrangement constraints rotational degree of freedom. It is to be noted that the inner diameter of the circular aperture 120 of the arm 115 is same as the outer diameter of the D-profile 105 surface of the washer 100 to firmly engage the washer 100 inside the circular aperture 120 of the arm 115. The D shape profile 105 locking does not allow the washer 100 to rotate around its center axis and this further reduces the chance of nut loosening in operation.

Figure 2A:
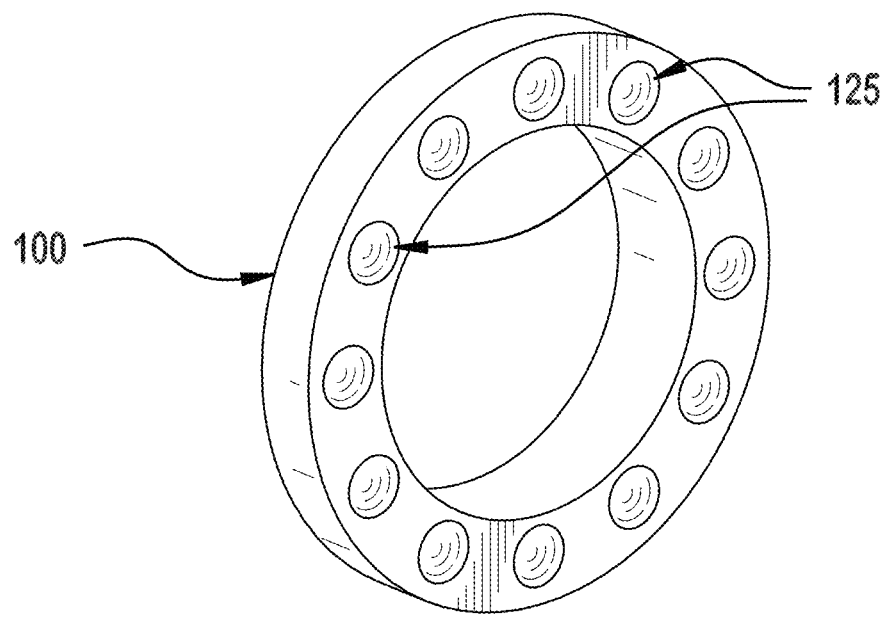
FIG. 2B illustrates a surface of the anti-rotation washer in accordance with an embodiment of the present disclosure.
Figure 2B:
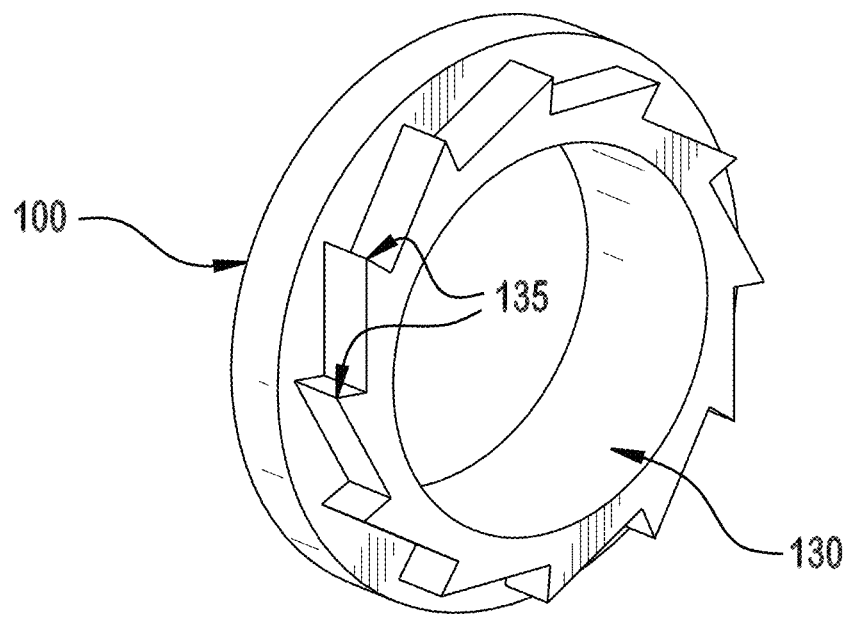

FIG. 2A and FIG. 2B illustrates a second surface of the anti-rotation washer in accordance with an embodiment of the present disclosure. The anti-rotation washer 100 includes two surfaces or sides, referred hereafter as a first surface and a second surface. The first surface includes the D-shaped profile 105.

In one embodiment, the anti-rotation washer 100 includes a plurality of leaf-shaped grooves 125 on a second surface, as depicted in FIG. 2A. The plurality of leaf-shaped grooves 125 on the anti-rotation washer 100 is semi-circular at one end and the other end is tapering gradually for providing low resistance during tightening of a lock nut. It is to be noted that the semi-circular portion of the leaf-shaped grooves 125 is designed so as to receive the spring loaded ball when the lock nut is in locked position.

In another embodiment, the anti-rotation washer 100 includes a ratchet teeth collar 130 having a plurality of ratchet teeth 135 on the second surface, as depicted in FIG. 2B. The plurality of ratchet teeth 135 is formed on periphery of the ratchet teeth collar 130 and protrude outwards from the periphery of the ratchet teeth collar 130. In one example, forward angle of each tooth is approximately "5" degrees and backward angle is approximately "45" degrees and has a similar teeth profile. It is to be noted that the angle of protrusion of the ratchet teeth 135 may vary. The ratchet teeth collar 130 having the plurality of ratchet teeth 135 holds the lock nut without loosening.

There are many advantages of using the D-shaped profile anti-rotation washer 100. The D-shaped profile constraints the loosening/rotation around shaft axis. The anti-rotation washer 100 eases mounting and dismounting. The D-shaped profile reduces the chance of the nut loosening in operation. It also reduces the chance of loss of bearing preload. Further, it increases the life of the Agri-hub.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

We claim:

1. A washer which is circularly profiled and configured to be anti-rotation, the washer being configured for use with a device defining a device aperture therein, the device having a device surface surrounding the device aperture, the washer comprising:
　a washer body having a first surface configured to abut the device surface;
　a projection which is semi-annular is located on the first surface of the washer body and extends axially therefrom to form a step profile locking mechanism, the projection having a projection annular inner surface, the projection having a projection outer surface which has a D-shaped profile when viewed in cross-section; and
　the washer body having a washer body inner annular surface which in combination with the projection annular inner surface combines to define a central axial washer aperture for receiving a shaft, wherein the inner annular surface is unthreaded.

2. The washer as claimed in claim 1, wherein the washer is detachably attachable to the device.

3. The washer as claimed in claim 1, wherein the device is an arm and the washer first surface abuts the arm.

4. The washer as claimed in claim 3, wherein the device aperture is D-shaped when viewed in cross-section such that the projection of the washer body positively engages the device aperture to prevent rotation between the washer body and the arm.

5. The washer as claimed in claim 1, wherein the device is an arm and the device aperture has a truncated circular shape when viewed in cross-section engaged with the projection of the washer to reduce relative rotation therebetween.

6. The washer as claimed in claim 1, wherein the washer body has a second surface opposite from the first surface, the second surface defining a plurality of leaf-shaped grooves therein.

7. The washer as claimed in claim 1, wherein the washer is made of one of a steel, non-ferrous metal, or alloys.

8. The washer as claimed in claim 1, wherein the washer body has a second surface opposite from the first surface, the second surface having a ratchet teeth collar having a plurality of ratchet teeth on the second surface.

9. The washer as claimed in claim 1, wherein the washer body has a second surface opposite from the first surface, the second surface having a ratchet teeth collar thereon and projecting axially outwardly therefrom, the ratchet teeth collar defining an inner collar aperture, the inner collar aperture combining with the washer body inner annular surface and the projection annular inner surface to define the central axial washer aperture, the ratchet teeth collar having a radial outer surface which forms a plurality of ratchet teeth.

* * * * *